(12) United States Patent
Singh et al.

(10) Patent No.: US 9,751,052 B2
(45) Date of Patent: Sep. 5, 2017

(54) TRIPLE LAYER HYDROPHOBIC-HYDROPHILIC MEMBRANE FOR MEMBRANE DISTILLATION APPLICATIONS

(75) Inventors: Gurdev Singh, Singapore (SG); James Antony Prince, Singapore (SG)

(73) Assignee: Ngee Ann Polytechnic, Singapore (SG)

( * ) Notice: Subject to any disclaimer, the term of this patent is extended or adjusted under 35 U.S.C. 154(b) by 659 days.

(21) Appl. No.: 14/357,334

(22) PCT Filed: Nov. 17, 2011

(86) PCT No.: PCT/SG2011/000407
§ 371 (c)(1),
(2), (4) Date: Jul. 22, 2014

(87) PCT Pub. No.: WO2013/074040
PCT Pub. Date: May 23, 2013

(65) Prior Publication Data
US 2014/0326658 A1    Nov. 6, 2014

(51) Int. Cl.
*B01D 71/56*    (2006.01)
*B01D 69/02*    (2006.01)
(Continued)

(52) U.S. Cl.
CPC .......... *B01D 71/56* (2013.01); *B01D 61/364* (2013.01); *B01D 67/0004* (2013.01);
(Continued)

(58) Field of Classification Search
CPC .. B32B 7/00; B32B 7/04; B32B 7/045; B32B 7/10; B32B 7/12; B32B 5/22; B32B 5/24; B32B 5/26

USPC .... 210/767, 483, 496, 500.1, 500.21, 502.1, 210/503, 504, 505, 506, 507, 508; 442/153, 79, 85, 86, 88, 89, 239, 268, 442/777, 278, 285, 381, 289, 390, 392, 442/394, 400, 415, 416, 417; 202/163, 202/172–174, 232, 177, 197, 200; 55/16,
(Continued)

(56) References Cited

U.S. PATENT DOCUMENTS 4,419,187 A * 12/1983 Cheng .................. B01D 61/364
159/DIG. 27
4,419,242 A    12/1983 Cheng et al.
(Continued)

FOREIGN PATENT DOCUMENTS

CN    102228801 A    11/2011
WO    2010009043 A2    1/2010
(Continued)

OTHER PUBLICATIONS

International Search Report for International Application No. PCT/SG2011/000407, International Filing Date Nov. 17, 2011, Search Completed Feb. 14, 2012, Mailed Feb. 20, 2012, 2 pgs.
(Continued)

*Primary Examiner* — Allison Fitzsimmons
(74) *Attorney, Agent, or Firm* — KPPB LLP

(57) ABSTRACT

This invention relates to a triple layer composite nanofiber membrane for Membrane Distillation (MD) applications. The triple layer membrane has an extremely hydrophobic nanofiber layer, a hydrophobic microporous middle layer and a hydrophilic backing layer for MD applications.

36 Claims, 13 Drawing Sheets

(51) Int. Cl.
*B01D 69/12* (2006.01)
*B32B 3/26* (2006.01)
*B01D 61/36* (2006.01)
*B01D 67/00* (2006.01)
*B01D 71/34* (2006.01)
*B01D 71/70* (2006.01)
*B01D 71/06* (2006.01)
*B01D 71/36* (2006.01)

(52) U.S. Cl.
CPC ............ *B01D 69/02* (2013.01); *B01D 69/12* (2013.01); *B01D 69/127* (2013.01); *B01D 71/06* (2013.01); *B01D 71/34* (2013.01); *B01D 71/36* (2013.01); *B01D 71/70* (2013.01); *B32B 3/26* (2013.01); *B01D 2319/06* (2013.01); *B01D 2323/39* (2013.01); *B01D 2325/02* (2013.01); *B01D 2325/36* (2013.01); *B01D 2325/38* (2013.01)

(58) Field of Classification Search
USPC .......... 55/158, 321.1, 321.5, 640, 506, 644, 55/500.2
See application file for complete search history.

(56) References Cited

U.S. PATENT DOCUMENTS

| | | | |
|---|---|---|---|
| 7,390,760 B1* | 6/2008 | Chen | A61F 13/514 442/340 |
| 7,488,421 B2* | 2/2009 | Hambitzer | B01D 61/364 202/181 |
| 2003/0065298 A1* | 4/2003 | Krishnaswamy-Mirle | A61F 13/51456 604/378 |
| 2007/0125700 A1* | 6/2007 | Ding | B01D 39/083 210/490 |
| 2008/0149561 A1 | 6/2008 | Chu et al. | |
| 2008/0254091 A1 | 10/2008 | Lee et al. | |
| 2009/0032475 A1* | 2/2009 | Ferrer | B01D 17/10 210/799 |
| 2010/0181249 A1 | 7/2010 | Green et al. | |
| 2010/0323573 A1 | 12/2010 | Chu et al. | |
| 2011/0031100 A1 | 2/2011 | Qtaishat et al. | |
| 2011/0124941 A1* | 5/2011 | Verdegan | B01D 17/045 585/818 |
| 2012/0061332 A1* | 3/2012 | Kas | A61L 2/022 210/767 |
| 2016/0228823 A1* | 8/2016 | Seo | C02F 1/42 |

FOREIGN PATENT DOCUMENTS

| WO | 2011015439 A1 | 2/2011 |
|---|---|---|
| WO | 2011029625 A1 | 3/2011 |

OTHER PUBLICATIONS

Feng, C. et al., "Production of Drinking Water from Saline Water by Air-Gap Membrane Distillation Using Polyvinylidene Flouride Nanofibre Membrane," Dec. 23, 2007, Journal of Membrane Science, pp. 1-5.

Bonyadi, Sina et al., "Flux enhancement in membrane distillation by fabrication of dual layer hydrophilic-hydrophobic hollow fiber membrane", Journal of Membrane Science, vol. 306, Aug. 23, 2007, pp. 134-136.

Gopal, Renuga et al., "Electrospun nanofibrous polysulfone membranes as pre-filters: Particulate removal", Journal of Membrane Science, vol. 289, Dec. 12, 2006, pp. 210-219.

* cited by examiner

TRIPLE LAYER HYDROPHOBIC-HYDROPHILIC MEMBRANE FOR MEMBRANE DISTILLATION APPLICATIONS

FIELD OF THE INVENTION

This invention relates to a triple layer composite nanofiber membrane. More particularly, this invention relates to a triple layer composite nanofiber membrane for Membrane Distillation (MD) applications. Still more particularly, this invention relates to a triple layer membrane with an extremely hydrophobic nanofiber layer, a hydrophobic microporous middle layer and a hydrophilic backing layer for MD applications.

PRIOR ART

Membrane Distillation (MD) is a thermally driven process, in which only vapour molecules are transported through a membrane layer. The core element in MD is therefore the hydrophobic membrane which is permeable to vapour but impermeable to liquids. A liquid feed for a distilland is located on one side of the membrane and a collection area for the distillate or the collected liquid condensed from the vapour molecules is located on the other side of the membrane. The distilland is typically heated and the distillate is typically at a cooler temperature than the distilland. Evaporation takes place on the heated distilland side of the membrane and condensation occurs on the cooler distillate side of the membrane. As the distilland side has a much higher temperature as compared to the distillate side, the distilland side has a higher vapour pressure than the distillate side. As the membrane separates the distilland from the distillate, a vapour pressure gradient exists between the two sides of the membrane. This vapour pressure gradient is the driving force that causes evaporated liquid from the distilland side to be transported through the membrane to the distillate area where the vapour then condenses into the desired liquid. The hydrophobic nature of the membrane prevents the distilland from wetting the membrane due to the surface tension forces. As a result, liquid/vapor interfaces are formed at the entrances of the pores of the membrane. The liquid distilland will only penetrate the dry pores of the membrane when a transmembrane pressure higher than the membrane liquid entry pressure (LEP) is applied. When the distilland penetrates the pores of the membrane, the pores will become saturated and clogged. This nullifies the liquid/vapour interfaces required for the evaporation/condensation process.

MD systems are more advantageous compared to reverse osmosis systems and pure distillation systems as MD systems operate at much lower pressures and lower temperatures. MD systems have been around since the late 1960s but have not been widely commercially adopted as a water desalination process partially because there are currently no suitable membranes for this process. Recently, MD systems are considered as a potentially viable solution for the treatment of sea water because of the intensified research being carried out on membranes for MD systems. One reason that research into MD systems has intensified is that MD systems may tap into renewable heating sources such as solar energy or excess heat generated from power plants to heat the distilland.

There are presently four general types of membrane distillation systems and these include Air Gap Membrane Distillation (AGMD), Direct Contact Membrane Distillation (DCMD), Vacuum Membrane Distillation (VMD), and Sweep Gas Membrane Distillation (SGMD). Regardless of the type of membrane distillation system, the MD membrane must have good thermal insulation; the membrane structure must have high liquid entry pressure and has to be microporous. The MD membrane must have good thermal insulation to ensure that the temperature gradient is maintained across the membrane structure. When the temperature gradient is steeper, the permeation rate of water vapour will be higher. The high hydrophobicity and high liquid entry pressure of the membrane structure is required to prevent the distilland from entering the microporous structure of the membrane and wetting the pores. The wetting of the pores of the membrane is a major problem that greatly limits the lifespan and performance of MD membranes.

Membranes that are typically used in MD systems generally include porous membranes manufactured from hydrophobic material such as polypropylene (PP), poly vinylidene fluoride (PVDF), and polytetrafluoroethylene (PTFE). However, the level of hydrophobicity and liquid entry pressure of these membranes are still insufficient for use in commercial MD systems.

Some proposed methods to increase the hydrophobicity of the MD membrane include coating, or plasma grafting or radically polymerizing the microporous membrane with hydrophobic materials or chemicals such as PDMS, polystyrene, silicone rubber, poly(1-trimethylsilyl-1-propyne) (PTMS) and polyketone. However, these proposed methods are deleterious because they further reduce the pore size of the microporous membrane by blocking the pores and in turn, this results in a reduction of the membrane distillation system flux.

A composite membrane for a membrane distillation system comprising a composite hydrophilic/hydrophobic membrane having a hydrophilic polymer layer and a hydrophobic polymer layer is described in US Patent Application Number 2011/0031100 A1, published on 10 Feb. 2011 in the name of Moh'd Rasool Qtaishat. In this document, synthesized surface modifying macromolecules (SMM) are blended to a hydrophilic host polymer to form porous hydrophobic/hydrophilic membranes using a phase inversion method. The phase inversion method disclosed in this document may be a dry-wet phase inversion technique or a temperature induced phase separation method. For the composite membrane disclosed in this document, SMM surface migration is critical in the preparation of the membrane and the phase inversion method is the method chosen by the authors.

A composite membrane for thermal membrane distillation comprising a hydrophobic layer sandwiched between two hydrophilic layers is described in U.S. Pat. No. 4,419,242, published on 6 Dec. 1983 in the name of Dah Y. Cheng. This document discloses a composite membrane comprising a microporous hydrophobic layer with a first hydrophilic layer on one surface and a second hydrophilic layer on the other surface. The hydrophobic microporous layer is manufactured from hydrophobic materials such as polytetrafluoroethylene (PTFE) and polyvinylidene fluoride (PVDF). The pores of the hydrophilic layer on the distilland side fill with water through capillary action. Evaporation takes place at the distilland/vapour interface and condensation takes place at the distillate/vapour interface. Such a composite membrane is disadvantageous because the hydrophobicity of the composite membrane is limited by the material used to manufacture the membrane and the arrangement of the layers does not increase the hydrophobicity of the composite membrane. Hence, those skilled in the art are constantly looking for ways to increase the hydrophobicity and liquid entry pressure of MD membranes while ensuring that the membrane has a high permeation flux.

SUMMARY OF INVENTION

The above and other problems in the art are solved and an advance in the art is made in accordance with this invention. A first advantage of a triple layer composite membrane in accordance with this invention is that the composite membrane has an extremely hydrophobic and porous layer at the distilland side which prevents the microporous middle layer from being water logged while allowing water vapour molecules to permeate through the porous layer easily. A second advantage of a composite membrane in accordance with this invention is that the composite membrane is able to withstand a maximum liquid entry pressure (LEP) of at least 350 kilopascals even though individually, a nanofiber layer is only able to withstand a maximum LEP of 20 kilopascals, a middle microporous layer is only able to withstand a maximum LEP of 200 kilopascals and a backing layer is only able to withstand a maximum LEP of 20 kilopascals. A third advantage of a composite membrane in accordance with this invention is that due to the porosity of the nanofiber layer, the thermal conductivity of the nanofiber layer is low, ensuring that the temperature gradient across the composite membrane is maintained at an optimum level.

In accordance with an embodiment of this invention, a multi-layered structure for membrane distillation applications comprises a microporous layer, a hydrophobic electrospun nanofiber layer and a hydrophilic backing layer. The nanofiber layer is disposed on a first surface of the microporous layer and the hydrophilic backing layer is disposed on a second surface of the microporous layer. The nanofiber layer has a larger contact angle than the contact angle of the microporous layer and the backing layer has a smaller contact angle than the contact angle of the microporous layer. The outer surface of the nanofiber layer adjoins a distilland, which is the liquid that is to be distilled. The larger contact angle of the nanofiber layer prevents the pores in the microporous layer from being wetted by the distilland. The nanofiber layer acts as a liquid-vapour interface between the distilland and the evaporated water vapours. The liquid-vapour interface formed at the nanofiber layer is able to withstand a predefined liquid entry pressure (LEP) of distilland whereby when this predefined LEP is exceeded, the pores of microporous layer will become water logged. Condensation of the water vapours occurs at the hydrophilic backing layer. The outer surface of the backing layer adjoins a distillate area that collects the condensation absorbed by the backing layer.

In accordance with an embodiment of this invention, the liquid-vapour interface at the nanofiber layer may withstand liquid entry pressures up to 350 kilopascals.

In accordance with an embodiment of this invention, the electrospun nanofiber layer has porosity between 70% and 90%, to trap air. In accordance with further embodiments of this invention, the pore sizes of electrospun nanofiber layer are between 0.05 μm and 5 μm.

In accordance with further embodiments of this invention, the microporous layer of the multi-layered structure has a pore size between 0.01 μm and 1 μm.

In accordance with further embodiments of this invention, the electrospun nanofiber layer is heat pressed or glued to the microporous layer. In accordance with further embodiments of this invention, the backing layer is solvent bound to the microporous layer. In accordance with further embodiments, the backing layer is heat pressed to the microporous layer. In accordance with further embodiments, the backing layer is glued to the microporous layer In accordance with further embodiments of this invention, the nanofibers of electrospun nanofiber layer has a diameter between 10 nm and 800 nm. In accordance with further embodiments of this invention, the nanofibers are spun with an air gap distance between 50 mm and 200 mm.)

In accordance with a further embodiment of this invention, hydrophobic additives are added to the electrospun nanofiber layer. In accordance with further embodiments, the hydrophobic additives comprise surface modifying agents such as, but not limited to, clay nanoparticles, carbon nanoparticles, carbon nanotubes, fullerenes, polystyrene, and Polydimethylsiloxane.

In accordance with further embodiments of this invention, the microporous layer has a contact angle between 70° and 130°. In accordance with still further embodiments of this invention, the electrospun nanofiber layer has a contact angle between 140° and 150° and the backing layer has a contact angle between 0° and 40°.

In accordance with further embodiments of this invention, the microporous layer has a thickness between 50 μm and 150 μm. In accordance with still further embodiments of this invention, the electrospun nanofiber layer has a thickness between 10 μm and 200 μm and the backing layer has a thickness between 50 μm and 100 μm.

In accordance with a further embodiment of this invention, the electrospun nanofiber layer comprises Polyvinylidene fluoride.

In accordance with further embodiments of this invention, the backing layer comprises melt blown fiber, spun bound fiber, microfibers and nanofibers such as, but not limited to Polyethylene terephthalate, Polyethylene, Polytetrafluoroethylene and Nylon.

BRIEF DESCRIPTION OF THE DRAWINGS

The above advantages and features of a method and apparatus in accordance with this invention are described in the following detailed description and are shown in the drawings.

DETAILED DESCRIPTION

This invention relates to a triple layer composite nanofiber membrane. More particularly, this invention relates to a triple layer composite nanofiber membrane for Membrane Distillation (MD) applications. Still more particularly, this invention relates to a triple layer membrane with an extremely hydrophobic nanofiber layer, a hydrophobic microporous middle layer and a hydrophilic backing layer for MD applications.

A triple layer composite nanofiber membrane in accordance with an embodiment of this invention is able to withstand a liquid entry pressure of at least 350 kilopascal (KPa). Furthermore, the electrospun nanofiber layer has a contact angle between 140° and 150° resulting in a highly hydrophobic layer.

Figure 1:
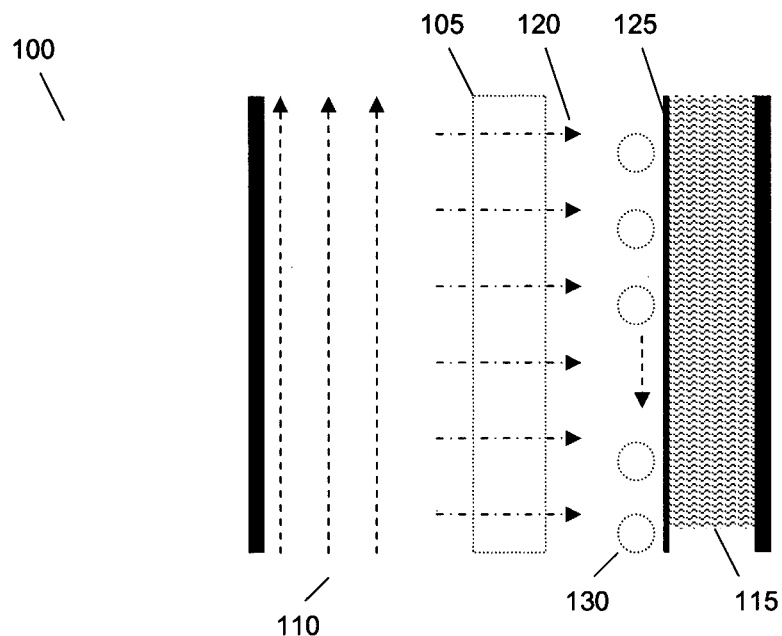
FIG. 1 illustrating a membrane distillation system in accordance with an embodiment of this invention.

MD system 100, shown in FIG. 1, is a MD system that may incorporate a membrane in accordance with embodiment of this invention. One skilled in the art will recognize that although the distilland and distillate are typically water. However, MD system 100 may be used for other liquids without departing from this invention. Further, the terms water and liquid are interchangeable throughout this disclosure and are to mean a substance being filtered by a system incorporating a membrane in accordance with this invention. FIG. 1 illustrates membrane 105 that separates distilland 110, which is located on one side of membrane 105 and distillate area 130, which is located on the other side of membrane 105. Distilland 110 is typically heated and distillate area 130 is maintained at a cooler temperature than distilland 110. Evaporation takes place on the heated distilland side of membrane 105 and condensation occurs on the cooler distillate side of membrane 105. The temperature difference across the membrane causes vapour from distilland 110 to permeate through membrane 105, as shown in arrows 120, to condense on cold surface 125. The vapour at cold surface 125 then condenses and combines with distillate at distillate area 130. Cooled flowing liquid 115 maintains cold surface 125 at a temperature optimum for condensation to occur. The pores in membrane 105 allow pure water vapour molecules to pass but filters out other residues. When membrane 105 becomes water logged through wetting, the pores of membrane 105 become blocked and as a result, water vapour will be unable to permeate through membrane 105. Wetting of membrane 105 typically occurs when a transmembrane pressure exceeding the maximum liquid entry pressure (LEP) of membrane 105 is applied.

Figure 2:
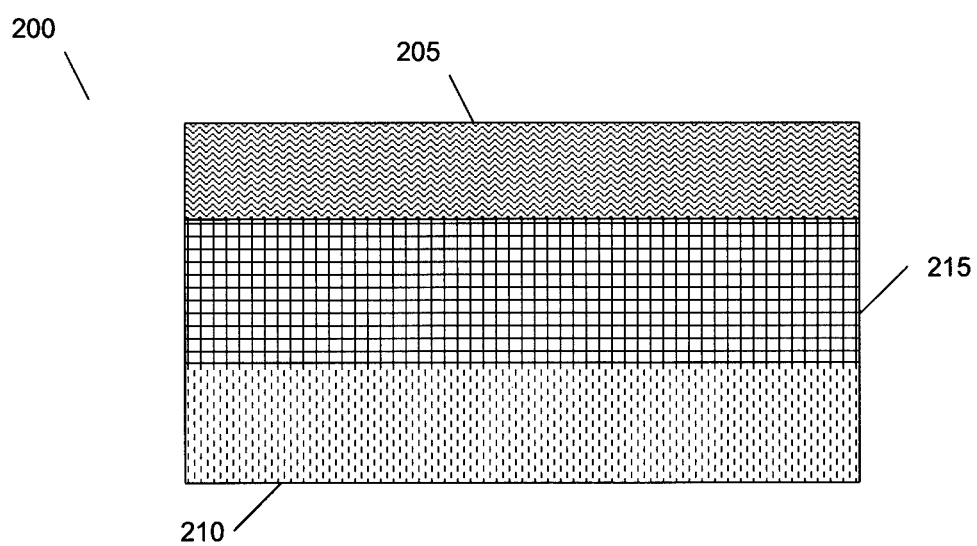
FIG. 2 illustrating a cross sectional view of a triple layer composite nanofiber membrane in accordance with an embodiment of this invention.

FIG. 2 illustrates a cross sectional view of a triple layer composite nanofiber membrane in accordance with an embodiment of this invention. Triple layer composite nanofiber membrane 200 comprises microporous layer 215 with electrospun nanofiber layer 205 disposed on a first surface and backing layer 210 disposed on a second surface. Electrospun nanofiber layer 205 is hydrophobic and backing layer 210 is hydrophilic. Backing layer 210 may comprise hydrophilic materials such as melt blown fiber, spun bound fibers or any other material that may be used as a backing material for membranes. In this particular embodiment, the thickness of backing layer 210 is typically between 50 μm and 100 μm and the pore sizes are typically between 1 μm and 10 μm.

Microporous layer 215 may be made using a wet casting process or a phase inversion process. The phase inversion process could be carried out using solvent evaporation, precipitation from vapour phase, precipitation by controlled evaporation, immersion precipitation diffusion induced phase separation or thermally induced phase separation or a combination of these methods. A wet casted polymer membrane may be manufactured from polymers such as, but not limited to, PVDF, PES, PSU, or PAN. The pore sizes of microporous layer 215 are preferably between 0.01 μm and 1.0 μm. In one embodiment of this invention, microporous layer 215 is manufactured from PVDF resulting in a microporous layer having good mechanical strength and high chemical resistance. In this particular embodiment, the thickness of microporous layer 215 is typically between 50 μm and 150 μm. Microporous layer 215 has a low hydrophobicity.

Electrospun nanofiber layer 205 is electrospun onto the first surface of microporous layer 215 forming a nanofiber mat that covers the entire first surface. Preferably, the thickness of electrospun nanofiber layer 205 is typically between 10 μm and 200 μm and the pore sizes are typically between 0.05 μm and 5.0 μm.

Figure 3:
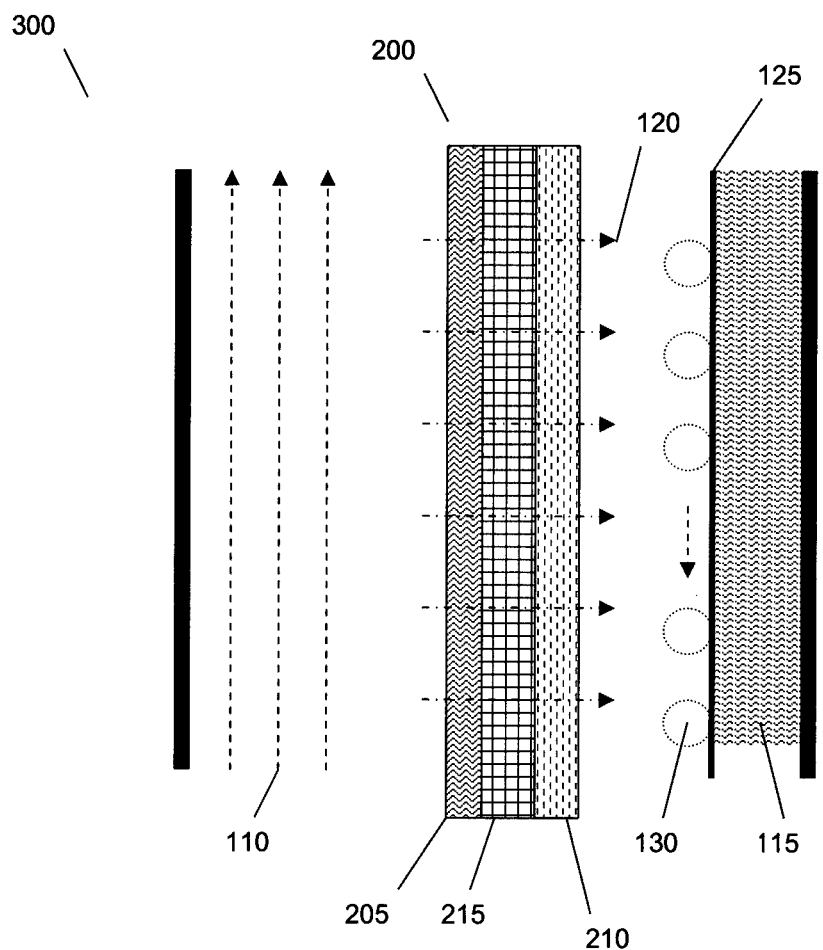
FIG. 3 illustrating a membrane distillation system with a triple layer composite nanofiber membrane in accordance with an embodiment of this invention.

FIG. 3 illustrates triple layer composite nanofiber membrane 200 being used in membrane distillation system 300. As illustrated in FIG. 3, the outer surface of electrospun nanofiber layer 205 is adjacent distilland 110 while the outer surface of backing layer 210 is adjacent distillate area 130. Microporous layer 215 acts as a filter, removing contaminants from the vapour evaporating from distilland 110. The filtered vapour then condenses at the distillate side where the temperature is lower. Microporous layer 215 may not be used alone efficiently and effectively as a membrane for membrane distillation applications as microporous layer 215 has low hydrophobicity even though microporous layer 215 may be manufactured from a material such as PVDF. Hence, over time, the pores in microporous layer 215 will become clogged with liquid preventing vapour from permeating through microporous layer 215. With the addition of electrospun nanofiber layer 205 at the side facing distilland 110, the hydrophobicity of composite membrane 200 increases greatly. Due to the increased hydrophobicity contributed by electrospun nanofiber layer 205, composite membrane 200 may be used efficiently and effectively in membrane distillation applications as the pores in microporous layer 215 are now effectively protected by the much more hydrophobic nanofiber layer 205. The permeation rate of vapour through composite membrane 200 is governed by the temperature gradient across composite membrane 200. Specifically, the permeation rate through composite membrane 200 is governed by the temperature gradient from the side containing the distilland to the side containing the distillate. By adding backing layer 210 to microporous layer 215, the permeation rate increases because the vapour now condenses in backing layer 210 instead of at surface 125 which is further away from microporous layer 215. Backing layer 210 is manufactured from a material that is hydrophilic. Hence, backing layer 210 has a high affinity to liquids. In composite membrane 200, liquid-vapour interfaces form at the entrances of membrane pores at the border where distilland 110 adjoins nanofiber layer 205 and, vapour-liquid interfaces form at the entrances of membrane pores at the border where microporous layer 215 adjoins backing layer 210. Evaporation takes place at the liquid-vapour interface where distilland 110 adjoins nanofiber layer 205 and condensation takes place at the interface where microporous layer 215 adjoins backing layer 210.

Typically, contact goniometry is the method that is used to determine the wettability of a surface. The contact angle of a particular surface is the angle at which a liquid-vapour interface meets a solid surface. The contact angle of any surface is specific for any given system and the contact angle is determined by the interactions between the interfaces of liquid-gas, solid-liquid and/or solid-gas. The degree of wetting of a specific surface depends on the surface tensions of the respective interfaces. The degree of wetting of a surface may be described by the contact angle of the surface. The contact angle is the angle at which the liquid-vapour interface meets the solid-liquid interface.

Figure 4:
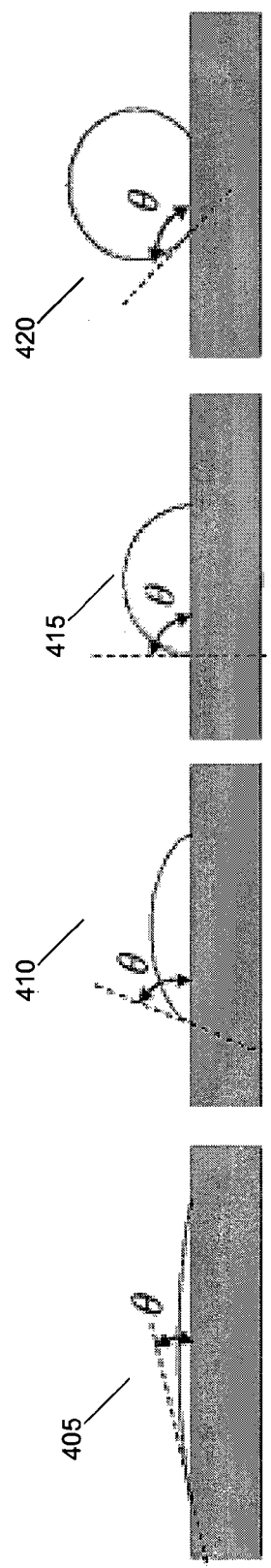
FIG. 4 illustrating the contact angles of a hydrophilic, hydrophobic and extremely hydrophobic materials.

FIG. 4 illustrates the contact angles of hydrophilic surface 405, less hydrophilic surface 410, hydrophobic surface 415 and extremely hydrophobic surface 420. As shown in FIG. 4, the contact angle is measured from a drop of a suitable liquid resting on a surface. If the liquid is very strongly attracted to a surface, the droplet of liquid will spread out across the solid surface. This can be seen at hydrophilic surface 405 where the droplet of water has spread out completely across the solid surface and contact angle θ is close to zero degrees. For less hydrophilic surfaces such as surface 410, contact angle θ is around 45° to 90°. As shown in FIG. 4, at surface 410, the droplet of water does not spread completely across the surface. For a hydrophobic surface such as surface 415, the contact angle is 90° or larger. For surfaces with a contact angle greater than 140° such as surface 420, such surfaces may be considered as extremely hydrophobic surfaces. On such surfaces, droplets of liquid rest on the extremely hydrophobic surface without actually wetting the pores. Hence, if the contact angle of a particular surface is provided, information regarding the interaction energy between the surface and the liquid may be easily obtained. The level of hydrophobicity/hydrophilicity of a surface may also be characterized by the contact angle of the surface.

Figure 5:
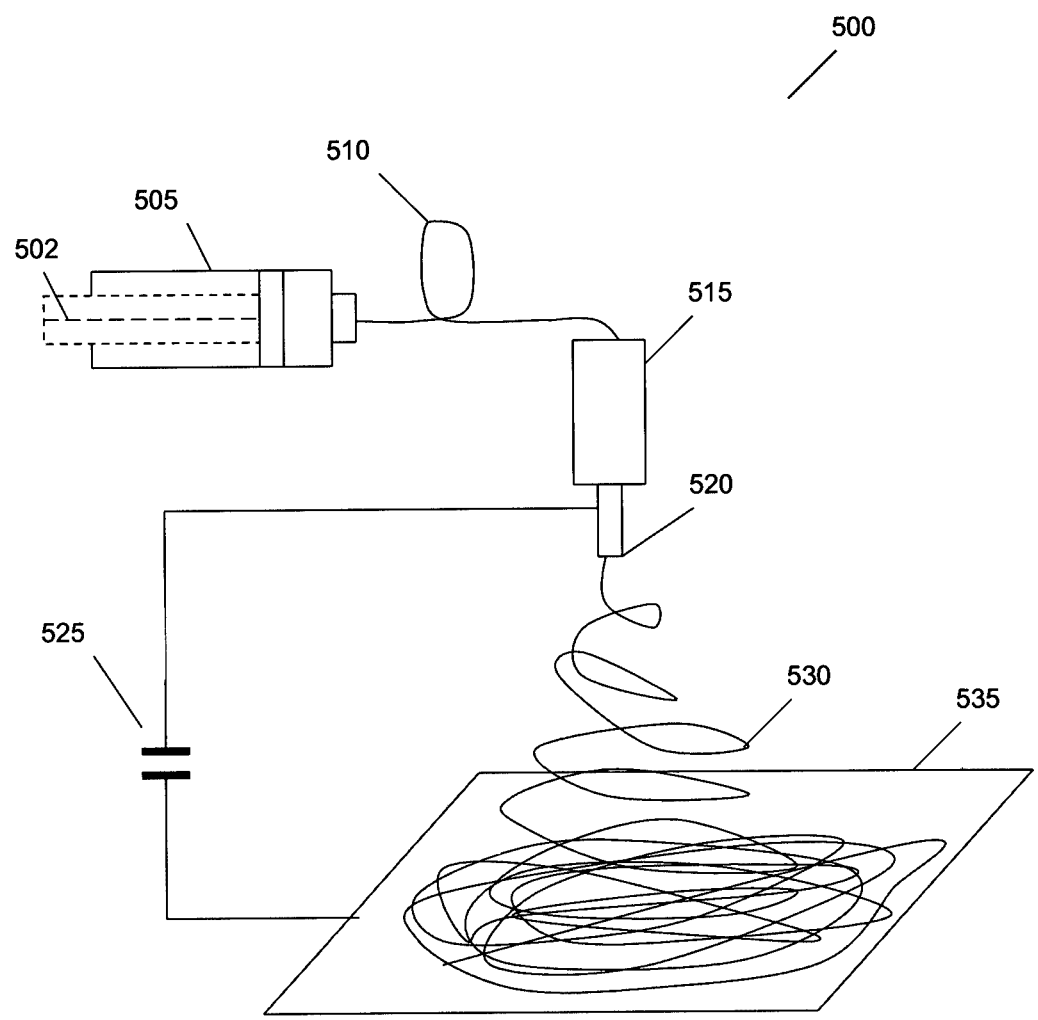
FIG. 5 illustrating a system to prepare an electrospun nanofiber layer in accordance with an embodiment of this invention.

FIG. 5 illustrates a standard setup to produce a nanofiber mat, such as nanofiber layer 205, using an electrospinning technique. Although nanofiber layer 205 is described as being formed by an electrospinning technique in this embodiment, one skilled in the art will recognize that other methods for producing nanofiber layer 205 may be used without departing from this invention. Electrospinning is a technique to produce extremely fine fibers by using electrical charge to draw fine fibers from a liquid. As shown in FIG. 5, liquid polymer 502 that is to be electrospun is contained within pump container 505. Liquid polymer 502 may comprise PVDF (Polyvinylidene fluoride), PES (Polyethersulfone), PS (Polysulfone), PAN (Polyacrylonitrile), PET (Polyethylene terephthalate), PP (Polypropylene), PVC (Polyvinyl Chloride), and PBI (Polybenzimidazole). One skilled in the art will recognize that other types of liquid polymer 502 may be used without departing from this invention.

Liquid polymer 502 is pumped through feed line 510 through to an input end of syringe 515 which has metallic needle 520 connected at the other end. High voltage supply 525 is connected to metallic needle 520 and collector mat 535 that is grounded. Liquid polymer 502 is loaded into pump container 505 and pumped through feed line 510 to syringe 515. Liquid polymer 502 is extruded from the tip of metallic needle 520 at the pumping rate of pump container 505. Due to the high voltage provided by voltage supply 525, the body of liquid polymer 502 becomes charged when liquid polymer 502 is extruded from the tip of metallic needle 520. The electrostatic repulsion counteracts the surface tension of liquid polymer 502 and forms a droplet that becomes stretched. At a critical point, the tip of the droplet becomes rounded and a stream of liquid will spiral out from the surface. This rounded tip at the droplet is known as a Taylor cone. Due to the sufficiently high molecular cohesion of the liquid polymer, a charged liquid jet stream is formed. As the jet stream dries in mid flight, the mode of current flow changes, causing the jet to become elongated by a whipping process, creating electrified jet stream 530 which spins and bends until electrified jet stream 530 deposits onto collector mat 535. The bending and spinning of electrified jet stream 530 causes the formation of elongated and thinned uniform fibers with nanometer diameters. In an embodiment of this invention, the electrospinning setup is used to produce a nanofiber mat with nanofibers having a diameter between 10 nm and 800 nm. In this embodiment, the air gap distance between metallic needle 520 and collector 535 is between 50 mm and 200 mm.

In further embodiments of this invention, hydrophobic additives may be added to liquid polymer 502 to produce electrospun nanofiber layer. These hydrophobic additives may comprise surface modifying agents such as, but not limited to, clay nanoparticles, carbon nanoparticles, carbon nanotubes, fullerenes, polystyrene, Polydimethylsiloxane, polyketone, polymers modified with oligomeric fluoropolymers.

Referring back to FIG. 2, electrospun nanofiber layer 205 may be formed on the first surface of microporous layer 215 using the electrospinning technique illustrated in FIG. 5. When microporous layer 215 is manufactured using hydrophobic materials such as PVDF, the contact angle of microporous layer 215 is between 70° to 130°. Due to the contact angle of microporous layer 215, liquid droplets will still partially spread out across the surface of microporous layer 215. The spreading of liquid droplets across the membrane surface is deleterious for membrane distillation applications as the pores in microporous layer 215 will get water logged easily, rendering the membrane useless. By depositing electrospun nanofiber layer 205 onto the first surface of microporous layer 215, the hydrophobicity of the membrane increases greatly as the contact angle of nanofiber layer 205 is between 140° to 160°. Due to the extremely high hydrophobicity of nanofiber layer 205 formed on microporous layer 215, the pores of microporous layer 215 will not get water logged as easily. For the membrane distillation system shown in FIG. 3, water vapour permeating through composite membrane 200 condenses at the side of distillate 130. By forming backing layer 210 on the other side of microporous layer 215, this increases the flux of the system as water vapour condenses at backing layer 210 instead of at surface 125 which is located further away. Backing layer 210 is hydrophilic in nature as backing layer 210 has a contact angle between 20° to 40°. Due to its hydrophilic nature, condensed liquid fills the pores of backing layer 210 resulting in the formation of a liquid-vapour interface at the border where backing layer 210 adjoins microporous layer 215.

In operation, as shown in FIG. 3, water vapour from the heated distilland evaporates at the liquid-vapour interface located at the nanofiber layer 205. Due to the temperature gradient and the vapour pressure gradient across composite membrane 200, the water vapour permeates across composite membrane 200. The pores of microporous layer 215 filters the water vapour molecules. The filtered water vapour molecules then condenses at the vapour-liquid interface located at backing layer 210. The condensed liquid is then collected at distillate area 130. Cold liquid 115 maintains the distillate side at a colder temperature preserving the temperature gradient across composite membrane 200.

For the optimum performance of a MD membrane, the temperature gradient across the MD membrane should be as steep as possible. Hence, a layer of thermal insulation should be located between the heated distilland and the cooler distillate in order to maintain the temperature gradient across the MD membrane. Nanofiber layer 205 has pore sizes between 0.05 µm to 5.0 µm. Due to the porosity and pore sizes of nanofiber layer 205, air is trapped between the pores, forming air bubbles within nanofiber layer 205. These bubbles of air act as thermal insulators preventing the heat transfer between the distilland and the distillate located on the other side of composite membrane 200.

Another unexpected advantage of composite membrane 200 is that when the different layers are used individually or in dual combinations, these membranes are unable to withstand a liquid entry pressure (LEP) as high as that of composite membrane 200. Table 1 below shows the comparison between the LEP of various combinations of the respective layers.

TABLE 1

| Types of Layers | LEP (Kilopascal) |
| --- | --- |
| An electrospun nanofiber layer (205) | 20 |
| A wet casted microporous layer (215) | 200 |
| A melt blown fiber backing layer (210) | 20 |
| Combination of layers (205) and (215) | 250 |
| Combination of layers (205) and (210) | 20 |
| Combination of layers (215) and (210) | 250 |
| Composite membrane (200) which is a combination of layers, (205), (215) and (210) | 350 |

As can be seen from Table 1, composite membrane 200 is able to withstand a liquid entry pressure of 350 kilopascals. Individually, nanofiber layer 205 is able to withstand a LEP of less than 20 kilopascals, microporous layer 215 is able to withstand a LEP of 200 kilopascals and backing layer 210 is able to withstand a LEP of less than 20 kilopascals. When these individual layers are added together, one skilled in the art would expect the overall LEP would be the sum of the LEP of the three layers that is 240 kilopascals. It can be seen from table 1 that composite membrane 200 is able to withstand a LEP of at least 350. Thus, not only does composite membrane 200 have high hydrophobicity, composite membrane 200 also boasts of unexpectedly high levels of LEP, being able to withstand LEPs well above the sum of the three individual layers.

Figure 6:
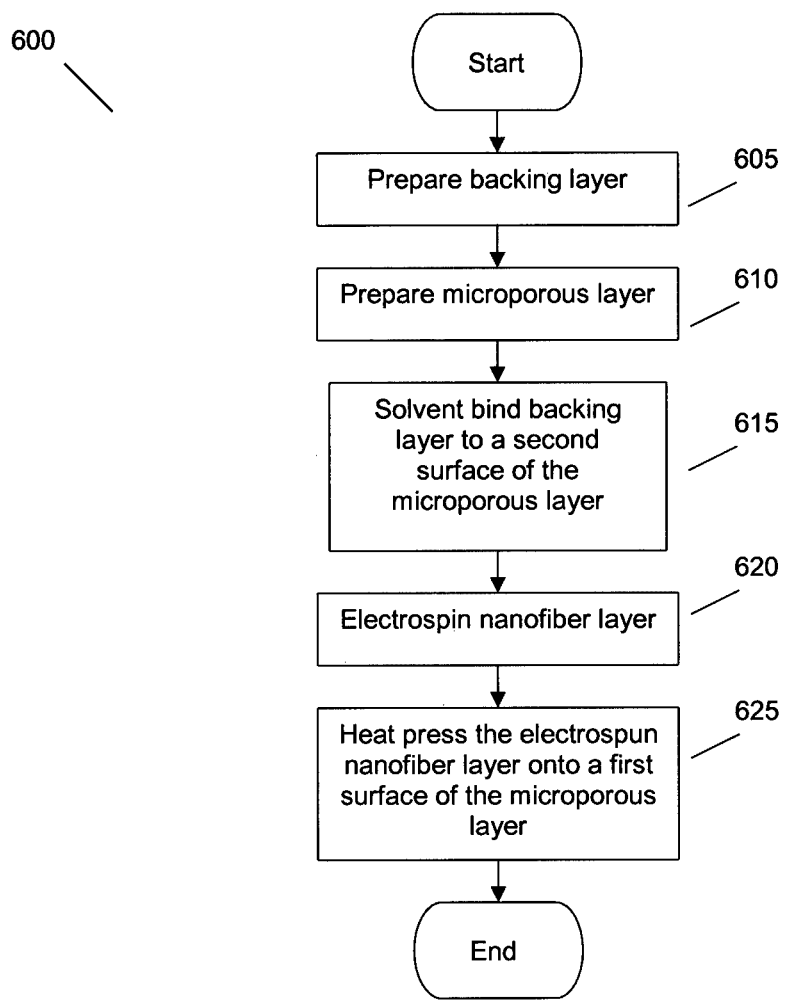
FIG. 6 illustrating a flowchart of a process producing a triple layer composite nanofiber membrane in accordance with an embodiment of this invention.

FIG. 6 illustrates flowchart 600 setting out a method to produce a composite membrane in accordance with an embodiment of this invention. In step 605, backing layer 210 is formed from a backing material such as melt blown fiber manufactured from materials such as polyethylene terephthalate (PET), polyethylene (PE), polypropylene (PP), polytetrafluroethylene (PTFE) or PSU. In step 610, microporous layer 215 is formed using standard wet casting methods or other similar methods. The polymers that may be used for microporous layer 215 include PVDF, PES, PSU or PAN. At step 615, backing layer 210 is then solvent bound to a surface of microporous layer 215. In step 620, nanofiber layer 205 is formed using an electrospinning technique as illustrated in FIG. 5. Nanofiber layer 205 is then heat pressed onto the other surface of microporous layer 215 at step 625. After step 625, the triple layer membrane is completed and process 600 ends.

In another preparation method, steps 605-615 may be combined. In this process, microporous layer 215 is wet casted directly onto backing layer 210. Nanofiber layer 205 is then electrospun onto the other surface of microporous layer 215. Nanofiber layer 205 is further heat pressed onto microporous layer for increased adhesion between layers.

In yet another preparation method, backing layer 210 and microporous layer 215 are heat pressed together instead of being solvent bound as shown in step 615. Nanofiber layer 205 is then electrospun in step 620 and subsequently heat pressed onto the other surface of microporous layer 215.

The following examples illustrate embodiments of this invention. One skilled in the art will realize that the examples set out below are not an exhaustive list of the embodiments of this invention.

Example 1

For the materials, the material PVDF Kynar® of 761 grade with a melting point of 165-172° C. was purchased from Arkema Pte. Ltd., Singapore. The material PVP-K17 of tech grade was purchased from Shanghai Welltone Material Technology Co., Ltd, Shanghai, China while Ethanol, Acetone and N,N" dimethyl acetamide (DMAC) of analytical grade were purchased from Sigma, Singapore. The water used was distilled and purified with a Milli-Q plus system from Millipore, Bedford, Mass., USA.

For the microporous layer casted onto the backing layer, casted PVDF membranes are prepared using an immersion precipitation method. Polyvinylidene fluoride polymer in dimethylacetamide (DMAC) may be used as the polymer dopant and PVP-K17 may be used as an additive while ethanol may be used as the nonsolvent. The composition of the casting solution is 17 wt % of PVDF, 5 wt % of PVP, 2 wt % of ethanol and 76 wt % of DMAC, respectively. PVDF and PVP powders are added into the DMAC mixture, the ethanol solution is mixed in a tri-neck RB flask, and the solution is mechanically stirred for at least 48 hrs at 80° C. to ensure complete dissolution of the polymer. The polymer solution is casted at room temperature by an immersion precipitation process. The PVDF dope solution is casted onto a glass plate at 25° C. at around 60% relative humidity by means of a casting knife. After some time had passed for the solution to evaporate, the solution-casting film is then immersed into water. The membrane turns opaque upon contact with water, which indicates that coagulation and precipitation of PVDF from the solution had occurred. A translucent, white, flat membrane is then formed. The membrane is subsequently transferred into a fresh water bath, which is refreshed frequently, to remove traces of residual ethanol and DMAC. Finally, a post treatment is applied to the casted membrane.

The casted membrane is immersed in a mixture of 50% ethanol and 50% N-Hexane for dehydration purposes (to remove water molecules from the surface of the membrane). After the dehydration step, the dehydrated membrane is dried in ambient room temperature. The nanofiber layer comprising of electro-spun PVDF membrane may be spun using a typical electro-spinning setup. A 15% solution of polyvinylidene fluoride (Kynar 761) in dimethylacetamide (DMAC) and acetone may be used as the polymer dopant. The polymer solution may be electro-spun at a rate of 2 ml/hr. Ten milliliters of the polymer solution is used to produce a nanofiber layer with a thickness of around 20 µm. A high voltage of approximately 16 KV is applied between the needle tip of the spinneret and the collection metal plate. The distance between the spinneret and the plate is about 150 mm. The PVDF casted membrane with the nanofiber layer is then heat pressed at 160° C. to produce the triple layer composite membrane.

For the testing of the performance of the triple layer composite membrane, the performance of a composite membrane with an effective area of 0.015 m² was tested against the performance of a conventional casted membrane in an air gap membrane distillation (AGMD) module. A 3.5 wt % solution of sodium chloride was used as the distilland. The composite membrane was installed at the centre of the membrane distillation module as shown in FIG. 3, with the hydrophobic layer being in contact with the heated distilland. The distilland was pumped to the module after being heated in a heat tank at a flow rate of 1.8 l/min. Cooling water with a similar flow rate was pumped to the module. The module has an air gap of 3 mm. The temperature of the distilland was varied between 30-80° C., while the temperature of the cooling water was maintained at 15-20° C. A metal plate was placed between the membranes and cooling water to collect the condensed water. The collected water was then added to the distillate. The flux of the system was calculated using a weight loss method.

Figure 7:
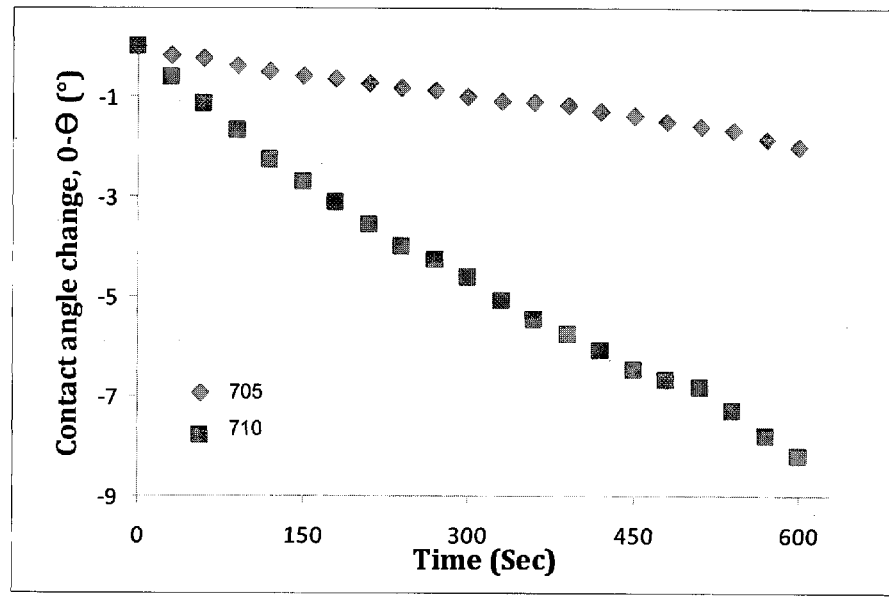
FIG. 7 illustrating the variation in contact angle of a triple layer composite nanofiber membrane in accordance with an embodiment of this invention and a two layer casted membrane across time.

FIG. 7 illustrates the variation in contact angle across time for triple layer composite membrane 705 and typical casted membrane 710. As can be seen from this illustration, the contact angle of triple layer composite membrane 705 changes by only 2° across 600 seconds whereas for typical casted membrane 710 the contact angle decreased by 9° across 600 seconds. This shows that triple layer composite membrane 705 is able to maintain its hydrophobic nature across time much better than typical casted membrane 710. Hence, such a membrane is ideal for use in membrane distillation applications that require membranes with high hydrophobicity.

Figure 8:
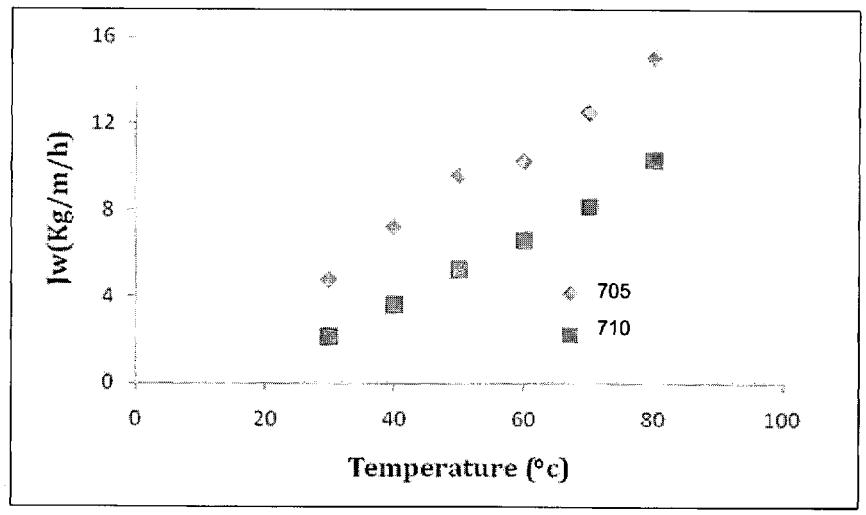
FIG. 8 illustrating the difference in permeation flux density of a triple layer composite nanofiber membrane in accordance with an embodiment of this invention and a two layer casted membrane when the temperature of a distilland is increased.

FIG. 8 illustrates the measured flux of an air gap membrane distillation system using typical casted membrane 710 and using triple layer composite membrane 705 in accordance with an embodiment of this invention. As shown in this Figure, the flux of the air gap membrane distillation system increases when the temperature difference between the distilland and distillate increases. This increase in flux is attributed to the increase in the temperature gradient across the respective membranes. As shown in FIG. 8, the flux of triple layer composite membrane 705 is higher compared to the flux of casted membrane 710 under similar system conditions. The increase in flux of the membrane distillation system with composite membrane 705 is attributed to the high porosity and the high hydrophobicity of the nanofiber layer. The highly porous and hydrophobic nanofiber layer allows water vapour to pass through easily while preventing the microporous layer from being wetted. The air bubbles formed within the pores of the nanofiber layer acts as a thermal insulator thus maintaining the temperature, gradient across the composite membrane at an optimum level.

Figure 9:
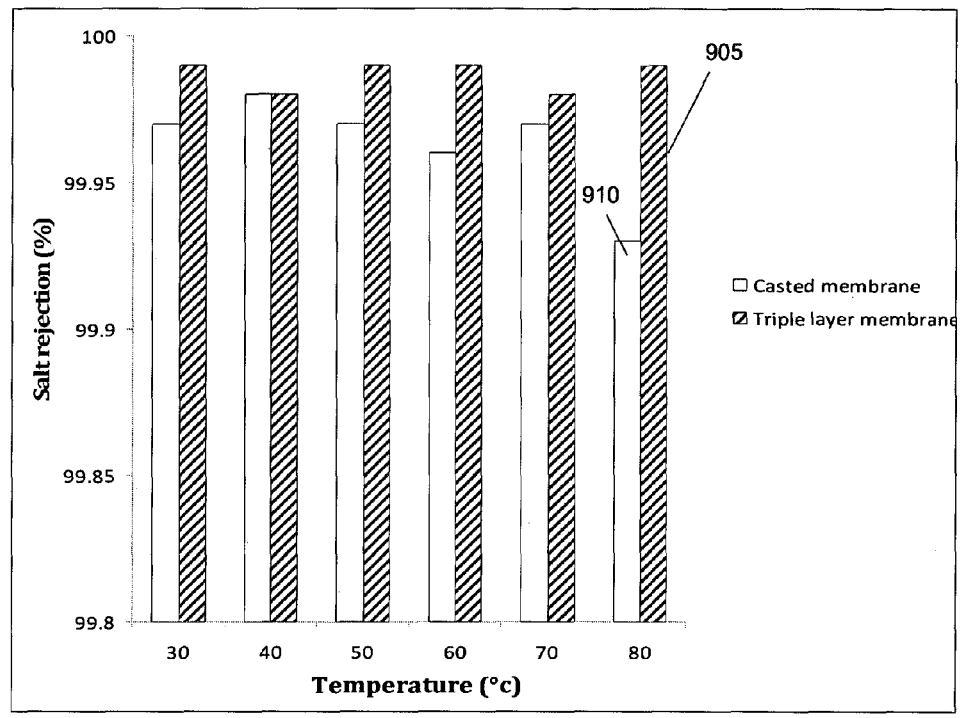
FIG. 9 illustrating the difference in salt rejection of a triple layer composite nanofiber membrane in accordance with an embodiment of this invention and a two layer casted membrane when the temperature of the distilland is increased.

FIG. 9 illustrates the average salt rejection of typical casted membrane 910 compared to the average salt rejection of triple layer composite membrane 905 in accordance with an embodiment of this invention in an air gap membrane distillation system. As shown in this figure, triple layer composite membrane 905 is more efficient at filtering salt from the distilland as compared to casted membrane 910.

Figure 10:
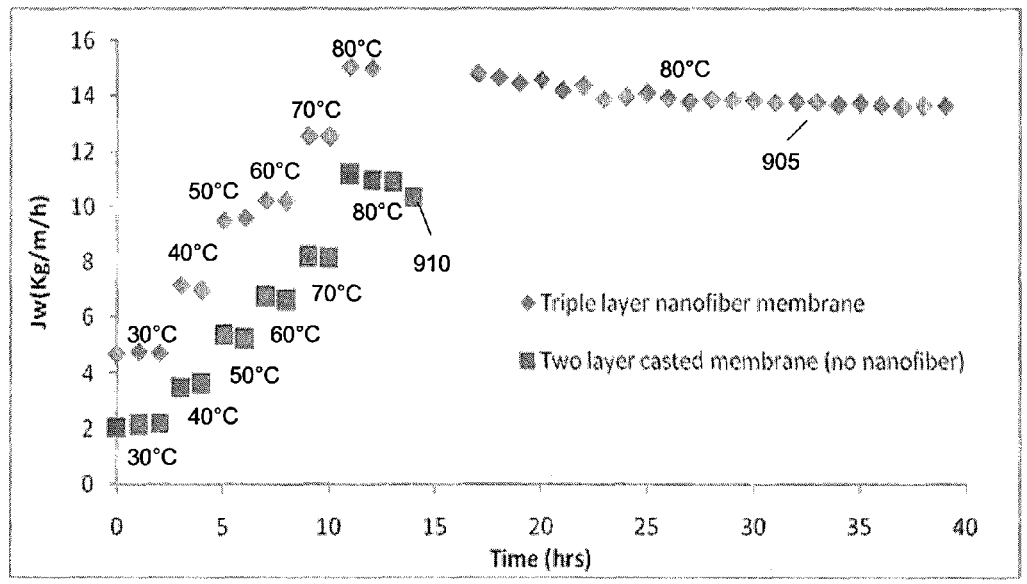
FIG. 10 illustrating the difference in permeation flux density of a triple layer composite nanofiber membrane in accordance with an embodiment of this invention and a two layer casted membrane when the temperature of the distilland is increased over time.

FIG. 10 illustrates the measured flux of an air gap membrane distillation system when two layer casted membrane 910 comprising a casted membrane and a backing layer is used; and when triple layer composite membrane 905 in accordance with an embodiment of this invention is used over a period of time. After approximately 15 hours, the flux of a membrane distillation system using triple layer composite membrane 905 is about 14 Jw(Kg/m²/h) whereas the flux of a membrane distillation system using two layer casted membrane 910 is no longer measurable as the pores of two layer casted membrane 910 have become blocked due to wetting of the pores.

Figure 11:
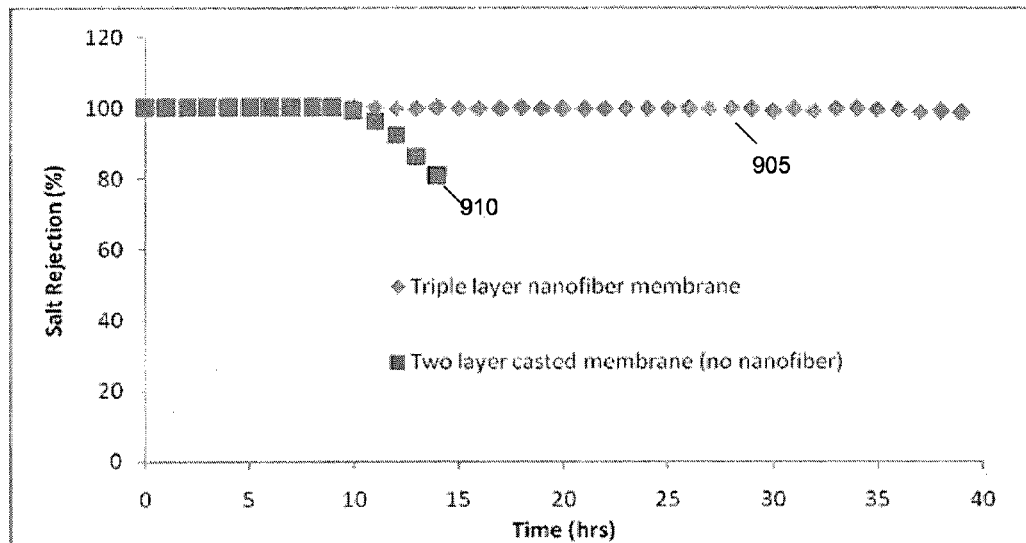
FIG. 11 illustrating the difference in salt rejection of a triple layer composite nanofiber membrane in accordance with an embodiment of this invention and a two layer casted membrane when the temperature of the distilland is increased over time.

FIG. 11 illustrates the average salt rejection of two layer casted membrane 910 compared to the average salt rejection of triple layer composite membrane 905 over a period of time. After approximately 15 hours, two layer casted membrane 910 is unable to filter salt molecules as the pores of two layer casted membrane 910 have become blocked due to wetting of the pores. For composite membrane 905, even after 40 hours, composite membrane 905 still continues to filter out salt molecules efficiently.

Example 2

In this embodiment, polydimethylsiloxane (PDMS) is added to microporous layer 215. Microporous layer 215 comprises PVDF-PDMS membranes that may be casted onto a backing layer. These PVDF-PDMS membranes may be prepared using a blending and immersion precipitation method. Polyvinylidene fluoride and poly(dimethylsiloxane) in dimethylacetamide (DMAC) may be used as the polymer dope and PVP-K17 may be used as an additive while ethanol is used as nonsolvent. The composition of the casting solution comprises 17 wt % of PVDF, 5 wt % of PVP, 2 wt % of ethanol, 0-6 wt % of PDMS and 70-76 wt % of DMAC, respectively. PVDF and PVP powders are added into the mixed DMAC, PDMS, and DI water solution in a tri neck RB flask, and the solution is mechanically stirred for at least 48 hrs at 80° C. to guarantee complete dissolution of the polymer. The polymer solution is casted at room temperature by an immersion precipitation process. The PVDF-PDMS dope solution is then casted onto a glass plate at 25° C. and at around 60% relative humidity by means of a casting knife. After a certain amount of time has lapsed to allow some evaporation, the solution-casting film is then immersed into water. The membrane, may turn opaque upon contact with water, indicating that the PVDF in the solution has undergone coagulation and precipitation. Finally a translucent, white, flat membrane will be formed.

The membrane is then transferred into a fresh water bath. The water bath is refreshed frequently to remove traces of residual DMAC. Finally, the casted membrane undergoes a post-treatment procedure. The casted membranes are immersed into a mixture of ethanol and N—Hexane for dehydration purposes, in order to remove water molecules from the surface of the membrane. Then, the dehydrated membranes are hung at an ambient room temperature to dry.

To investigate the effect of PDMS on the PVDF-PDMS composite membrane performance, experiments with different PDMS concentrations were carried out by adjusting the DMAC concentration while all other components were kept constant. Electro-spun PVDF membranes were spun on the selective layer of the casted PVDF-PDMS membrane using a typical electro-spinning setup. A 15% solution of polyvinylidene fluoride (Kynar 761) in dimethylacetamide (DMAC) and acetone was used as the polymer dopant. The polymer solution was electro-spun at a rate of 2 ml/hr. Ten milliliters of the polymer solution were used to produce a nanofiber membrane having around 20 µm thickness. A high voltage (16 KV) is applied between the needle tip of the spinneret and the collection metal plate. The distance between the needle tip and the metal plate is about 150 mm. The PVDF-PDMS casted membrane with the backing layer is then heat pressed at 160° C. with the nanofiber mat to produce the triple layer composite membrane.

Table 2 below compares the LEP of a PVDF-PDMS casted membrane with backing layer with the LEP of a triple layer composite membrane (with a PVDF-PDMS microporous layer and a PVDF nanofiber layer) when the concentration of the PDMS in the common casted membrane layer is varied. Table 2 also compares the contact angle of a PVDF-PDMS casted membrane with backing layer with the contact angle of a triple layer composite membrane (with a PVDF-PDMS microporous layer and PVDF nanofiber layer) when the concentration of the PDMS in the common casted membrane layer is varied.

TABLE 2

| | LEPw (Kpa) | | Contact Angle (°) | |
|---|---|---|---|---|
| PDMS concentration (wt %) | Casted membrane with a backing layer | Triple layer composite membrane | Casted membrane with a backing layer | Triple layer composite membrane |
| 0 | 280 | 350 | 86.5 | 139.5 |
| 1.5 | 400 | 440 | 91.3 | 141.3 |
| 3 | 480 | 530 | 93.2 | 138.5 |
| 4.5 | 570 | 640 | 101.5 | 139.2 |
| 6 | 620 | 730 | 111.8 | 142.4 |

As shown in Table 2, the triple layer composite membrane is able to withstand a higher LEP than a casted membrane with a backing layer membrane. When the concentration of PDMS is at 6 wt %, the triple layer composite membrane is able to withstand a LEP of 730 Kpa while the casted membrane with a backing layer is only able to withstand a LEP of 620 Kpa. As shown in Table 1, it is noted that an electrospun nanofiber layer on its own is able to withstand a LEP around 20 Kpa. However, when an electrospun nanofiber layer is added onto the casted membrane with a backing layer, the LEP limitation of the resulting membrane increases by around 100 Kpa even though the electrospun nanofiber layer has a LEP limitation around 20 Kpa. This effect becomes more apparent when the PDMS concentration increases as can be seen from Table 2.

Figure 12:
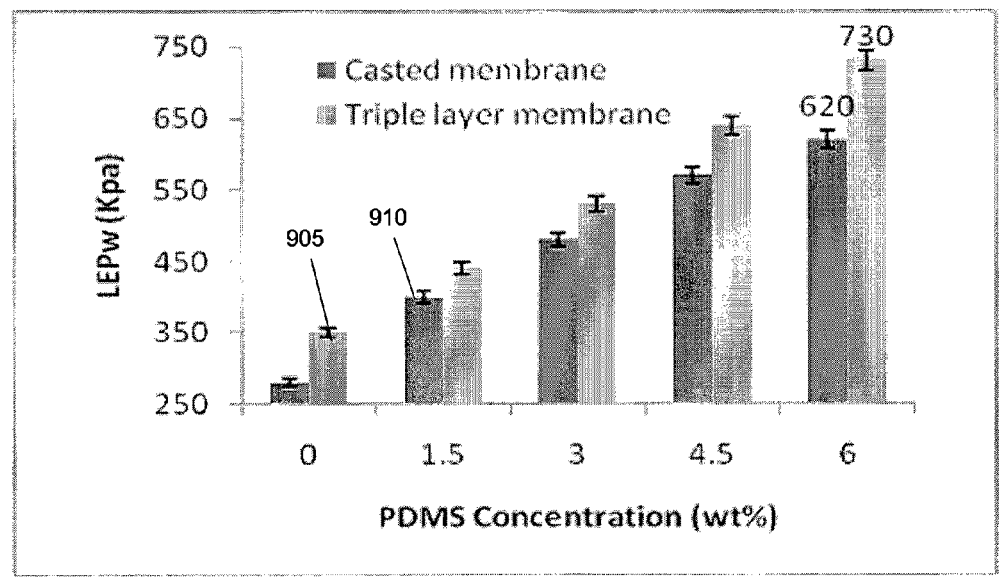
FIG. 12 illustrating the effect of PDMS concentration levels on the LEP of a casted membrane and a triple layer casted membrane.
Figure 13:
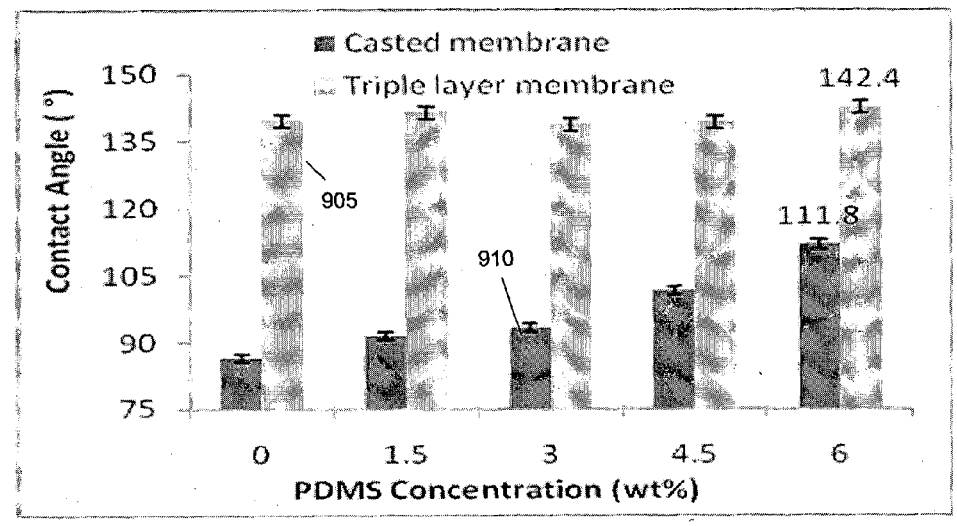
FIG. 13 illustrating the effect of PDMS concentration levels on the contact angle of a casted membrane and a triple layer casted membrane.

The contact angle of the triple layer casted membrane is also higher as compared to the contact angle of the casted membrane with a backing layer. The higher contact angle of the triple layer composite membrane may be attributed to the addition of the nanofiber layer on the microporous layer. FIGS. 12 and 13 illustrate the effect of various PDMS concentration levels on the LEP and contact angle of casted membrane with a backing layer 910 and triple layer composite membrane 905.

Figure 14:
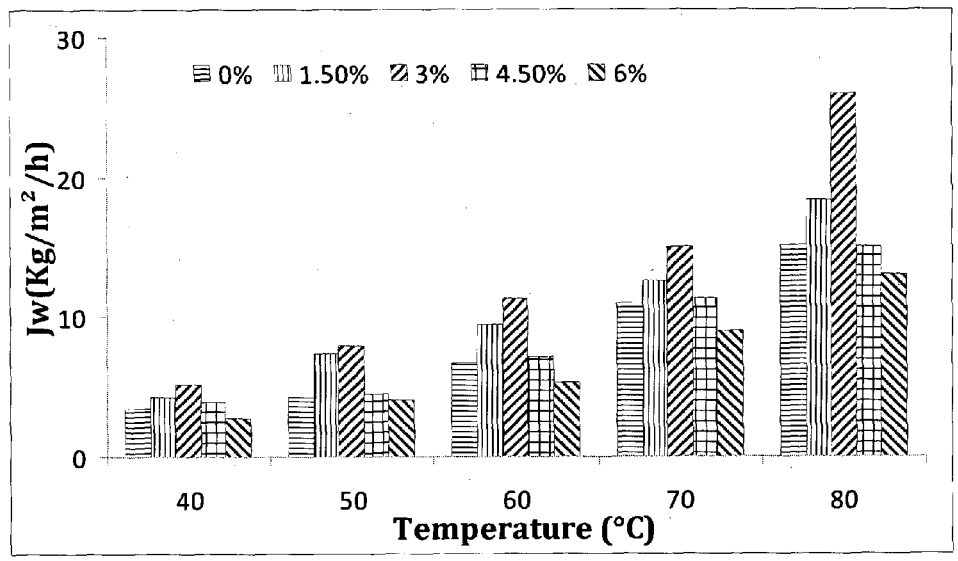
FIG. 14 illustrating the effect of various PDMS concentration levels on the membrane distillation flux of the triple layer casted membrane when the temperature of the distilland is increased.

FIG. 14 illustrates the effect of various PDMS concentration levels, at 0%, 1.5%, 3%, 4.5% and 6%, on the membrane distillation flux of the triple layer casted membrane when the temperature of the distilland is increased. FIG. 14 shows that the membrane distillation flux is at the optimum level when the concentration of the PDMS is at 3% wt.

Figure 15:
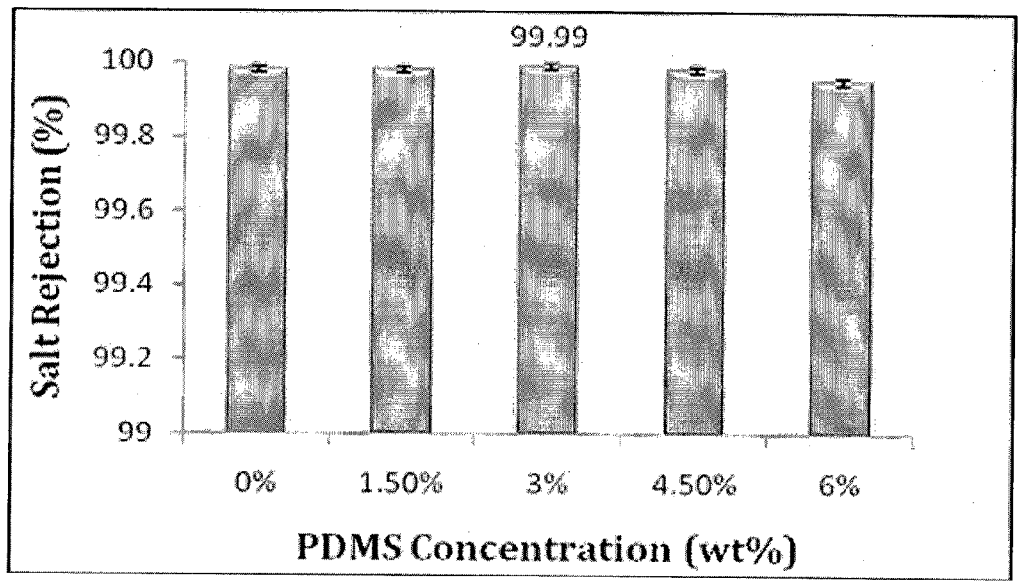
FIG. 15 illustrating the effect of various PDMS concentration levels on the salt rejection capability of the triple layer casted membrane.

FIG. 15 illustrates the effect of various PDMS concentration levels on the salt rejection capability of the triple layer casted membrane. As can be seen from this figure, the salt rejection capability of the triple layer casted membrane is not greatly affected by the change in concentration of PDMS in the membrane.

Figure 16:
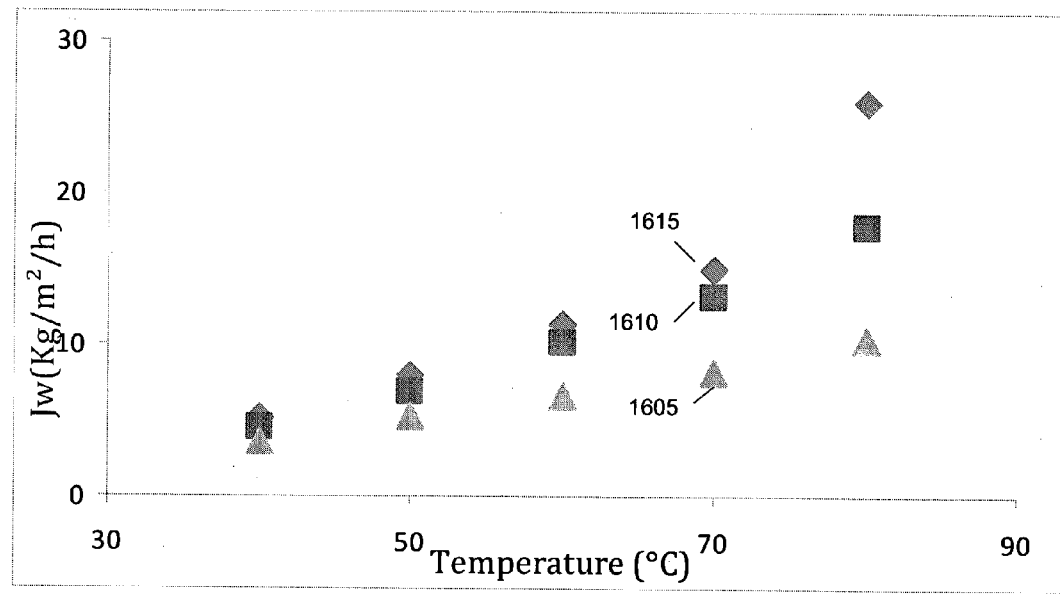
FIG. 16 illustrating the membrane distillation flux between three types of membranes: (1) a conventional PVDF casted membrane; (2) a conventional PDMS casted membrane; and (3) a triple layer PDMS-PVDF casted membrane.

FIG. 16 illustrates the membrane distillation flux between conventional PVDF casted membrane with backing layer 1605, conventional PVDF-PDMS casted membrane with backing layer 1610, and triple layer PDMS-PVDF casted membrane with PVDF nanofiber membrane on top 1615. PVDF-PDMS casted membrane with backing layer 1610 and triple layer PDMS-PVDF composite membrane 1615 have PDMS concentrations of 3% wt. As shown in this figure, the membrane distillation flux is optimum when the distilland is about 80° C. and triple layer PDMS-PVDF composite membrane with PVDF nanofiber membrane on top 1615 provides the optimum flux performance when compared to conventional PVDF casted membrane with backing layer 1605 and conventional PVDF-PDMS casted membrane with backing layer 1610.

Example 3

In this embodiment, at step 620 of the electrospinning setup as shown in FIG. 6, additives are added to liquid polymer 502. Additive added liquid polymer 502 is then used to produce a nanofiber mat. In an embodiment of this invention, clay additives are added to liquid polymer 502 comprising PVDF.

Figure 17:
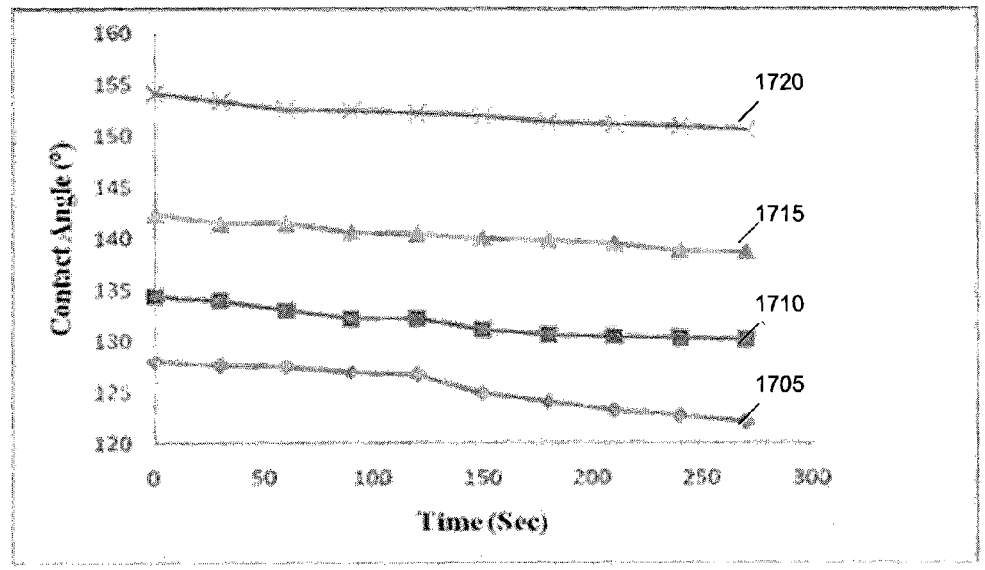
FIG. 17 illustrating the contact angles of nanofiber mats with various concentrations of clay additives across time.

FIG. 17 illustrates the contact angles of nanofiber mats 1705, 1710, 1715 and 1720 across time. Nanofiber mat 1705 was produced using a liquid polymer comprising PVDF 12 wt %, and nanofiber mat 1710 was produced using a liquid polymer comprising PVDF 12 wt % with clay of 2% wt being added. Nanofiber mat 1715 was produced using a liquid polymer comprising PVDF 12 wt % with clay of 4% wt being added and nanofiber mat 1720 was produced using a liquid polymer comprising PVDF 12 wt % with clay of 8% wt being added. This figure shows that when the concentration of the clay additive in liquid polymer 502 is increased, the contact angle of the nanofiber mat increases as well. The maximum amount of clay that can be added in to the polymer solution is 8 wt %. Above this concentration, the solution cannot be electrospun under normal conditions as the viscosity becomes too high. Hence, this limitation determines the optimum amount of clay that is to be added. Nanofiber mat 1720 which was produced using a liquid polymer comprising PVDF 12 wt % with a clay additive of 8% wt has the highest contact angle with an average contact angle about 153°, making nanofiber mat 1720 an extremely hydrophobic surface.

Figure 18:
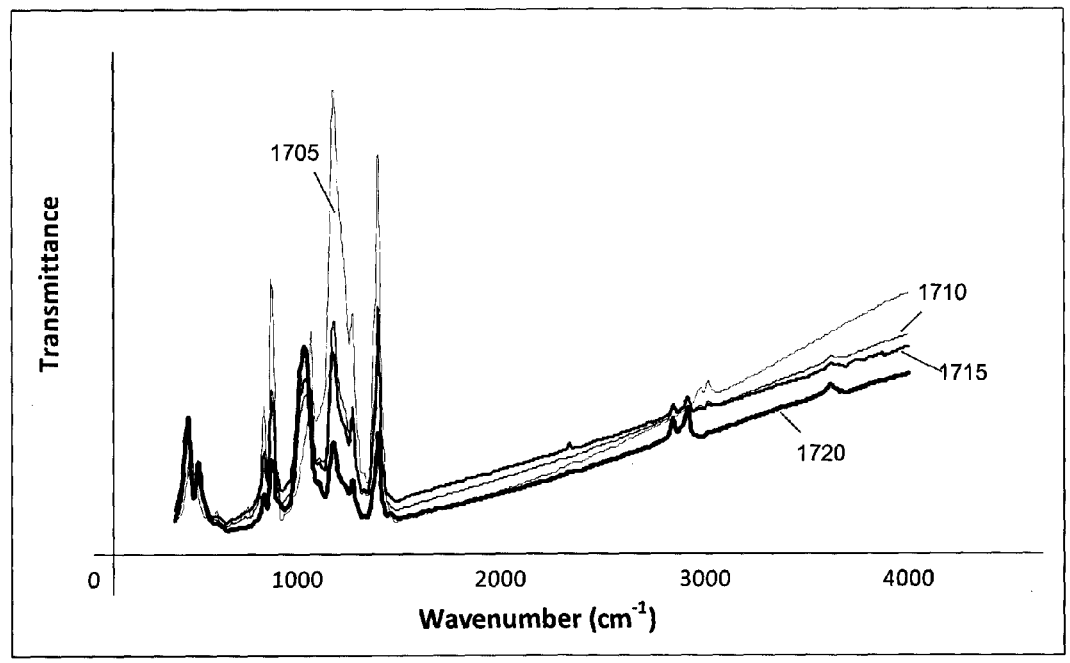
FIG. 18 illustrating the transmittance of nanofiber mats with various concentrations of clay additives across varying wavenumbers.

FIG. 18 illustrates the transmittance of nanofiber mats 1705, 1710, 1715 and 1720 across varying wavenumbers. FIG. 18 shows the presence of clay particle in the membrane. The additional peaks between 3510 and 3636 nm are due to the N—H (stretching). It is noted that the peak intensity of the N—H (stretching) increases with increasing content of clay particles.

Figure 19:
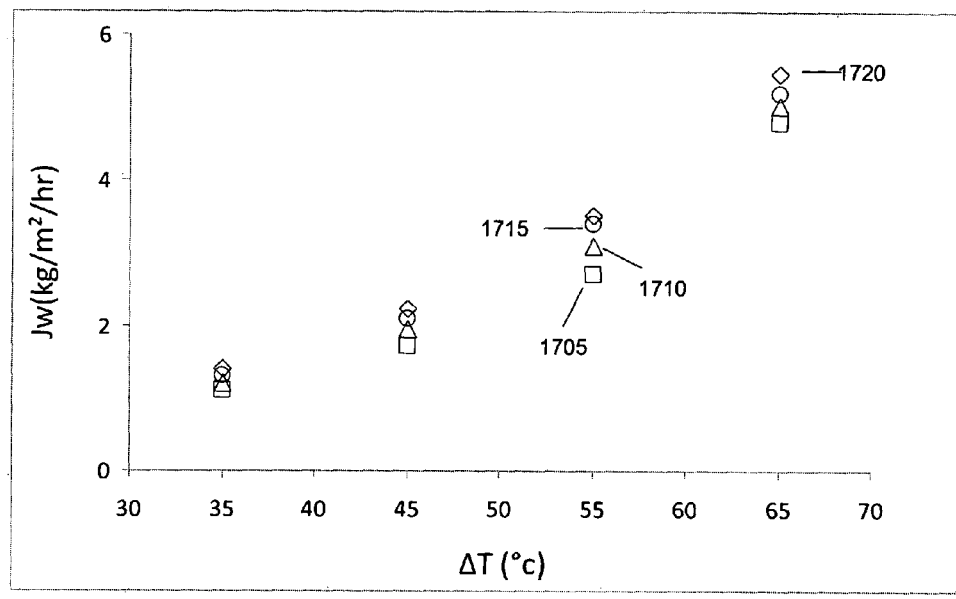
FIG. 19 illustrating the membrane distillation flux between nanofiber mats with various concentrations of clay additives across varying distilland temperatures.

FIG. 19 illustrates the membrane distillation flux between nanofiber mats 1705, 1710, 1715 and 1720 across varying distilland temperatures. As shown in this figure, when 8% wt of clay additive is added to the liquid PVDF, electrospun nanofiber mat 1720 is still able to achieve membrane distillation flux values that are slightly higher than nanofiber mat 1705, in which no clay additives have been added.

Figure 20:
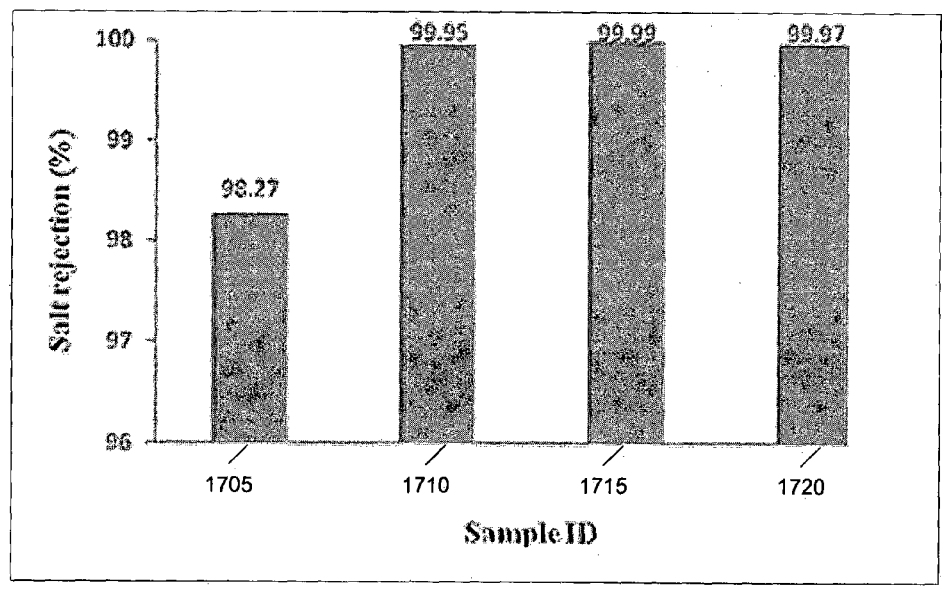
FIG. 20 illustrating the salt rejection capabilities of nanofiber mats with various concentrations of clay additives.

FIG. 20 illustrates the salt rejection capabilities of nanofiber mats 1705, 1710, 1715 and 1720. The addition of clay additives to the liquid polymer improves the salt rejection capability of the nanofiber mats. From this figure, it can be seen that the salt rejection capabilities of nanofiber mats 1710, 1715 and 1720 are comparable.

Figure 21:
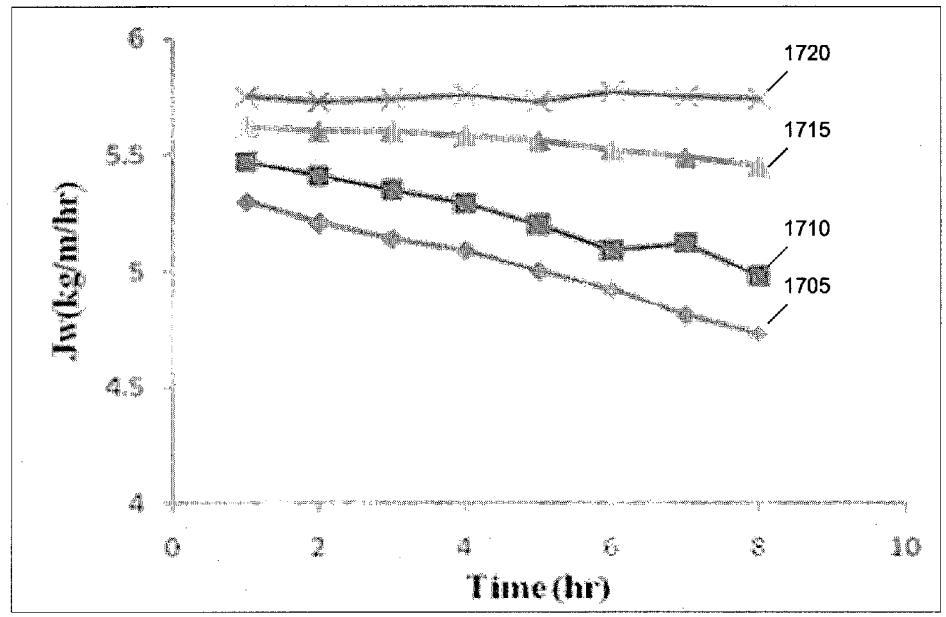
FIG. 21 illustrating the membrane distillation flux between nanofiber mats with various concentrations of day additives across time.

FIG. 21 illustrates the membrane distillation flux between nanofiber mats 1705, 1710, 1715 and 1720 across time. This figure shows that electrospun nanofiber mat 1720 is able to achieve membrane distillation flux values that are slightly higher than nanofiber mat 1705, in which no clay additives have been added.

Figure 22:
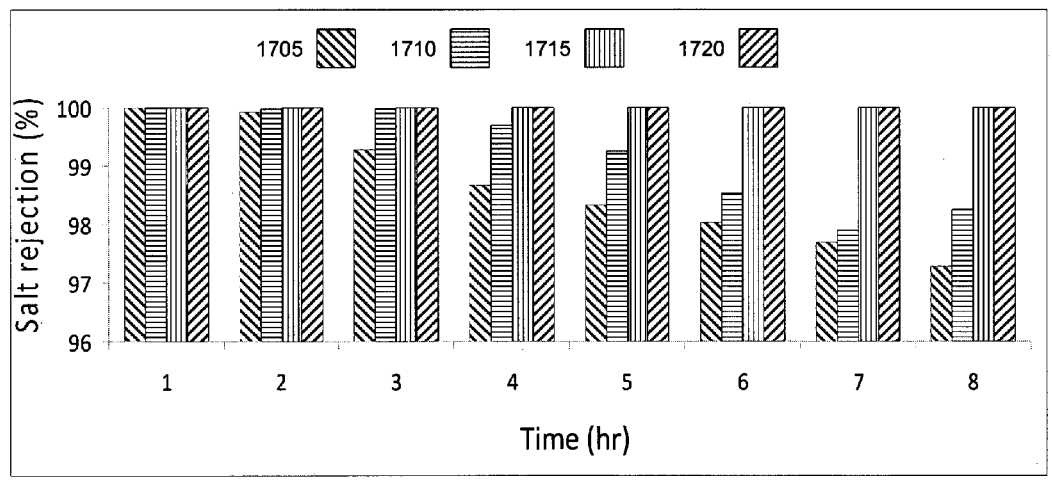
FIG. 22 illustrating the salt rejection capabilities between nanofiber mats with various concentrations of clay additives across time.

FIG. 22 illustrates the salt rejection capabilities between nanofiber mats 1705, 1710, 1715 and 1720 across time. This figure shows that when the concentration of the clay additives is increased, the electrospun nanofiber mat is able to maintain its salt rejection capabilities for a longer period.

FIGS. 17-22 show that by adding clay additives to liquid polymer 502 (that is to be electrospun into a nanofiber), the produced nanofiber mat has a higher contact angle, and is able to maintain its salt rejection capabilities for a longer period of time. Additionally, the membrane distillation flux of the nanofiber mat with the clay additive is comparable if not better as compared to the membrane distillation flux of a nanofiber mat produced without the addition of clay additives.

The above is a description of a triple layer membrane with an extremely hydrophobic nanofiber layer, a hydrophobic microporous middle layer and a hydrophilic backing layer for use in a membrane distillation system. It is foreseen that those skilled in the art can and will design alternative embodiments of this invention as set forth in the following claims.

The invention claimed is:

1. A multi-layered structure for membrane distillation comprising:
   a microporous layer having a first surface and a second surface;
   a hydrophobic electrospun nanofiber layer disposed on said first surface of said microporous layer, wherein said electrospun nanofiber layer has a larger contact angle than the contact angle of said microporous layer to prevent wetting of said microporous layer, and
   an outer surface of said electrospun nanofiber layer for adjoining a distilland, wherein said distilland comprises liquid for distillation, and said electrospun nanofiber layer acts as a liquid-vapor interface for withstanding a minimum predefined liquid entry pressure of distilland; and
   a hydrophilic backing layer disposed on said second surface of said microporous layer, wherein said backing layer has a smaller contact angle than the contact angle of said microporous layer to increase absorption of water vapor at said backing layer, and
   an outer surface of said backing layer for adjoining a distillate area for receiving a distillate wherein said distillate comprises liquid condensing from vapor passing through said multi-layered structure.

2. The multi-layered structure of claim 1 wherein said liquid-vapor interface withstands liquid entry pressures of said distilland of at least 350 kilopascals.

3. The multi-layered structure of claim 1 wherein said electrospun nanofiber layer has porosity between 70% and 90%, to trap air.

4. The multi-layered structure of claim 3 wherein said electrospun nanofiber layer has an average pore size between 0.05 μm and 5 μm.

5. The multi-layered structure of claim 1 wherein said microporous layer has an average pore size between 0.01 μm and 1 μm.

6. The multi-layered structure of claim 1 wherein said electrospun nanofiber layer is heat pressed to said microporous layer.

7. The multi-layered structure of claim 1 wherein said electrospun nanofiber layer is glued to said microporous layer.

8. The multi-layered structure of claim 6 wherein said backing layer is solvent bound to said microporous layer.

9. The multi-layered structure of claim 6 wherein said backing layer is heat pressed to said microporous layer.

10. The multi-layered structure of claim 7 wherein said backing layer is glued to said microporous layer.

11. The multi-layered structure of claim 1 wherein said electrospun nanofiber layer comprises nanofibers with a diameter between 10 nm and 800 nm.

12. The multi-layered structure of claim 11 wherein said nanofibers are spun with an air gap distance between 50 mm and 200 mm.

13. The multi-layered structure of claim 1 wherein said electrospun nanofiber layer further comprises hydrophobic additives applied to said nanofiber.

14. The multi-layered structure of claim 13 wherein said hydrophobic additives comprise surface modifying agents.

15. The multi-layered structure of claim 13 wherein said hydrophobic additives comprise clay nanoparticles.

16. The multi-layered structure of claim 13 wherein said hydrophobic additives comprise carbon nanoparticles.

17. The multi-layered structure of claim 13 wherein said hydrophobic additives comprise carbon nanotubes.

18. The multi-layered structure of claim 13 wherein said hydrophobic additives comprise fullerenes.

19. The multi-layered structure of claim 13 wherein said hydrophobic additives comprise polystyrene.

20. The multi-layered structure of claim 13 wherein said hydrophobic additives comprise Polydimethylsiloxane.

21. The multi-layered structure of claim 1 wherein said microporous layer has a contact angle between 70° and 130°.

22. The multi-layered structure of claim 21 wherein said electrospun nanofiber layer has a contact angle between 140° and 160°.

23. The multi-layered structure of claim 21 wherein said backing layer has a contact angle between 0° and 40°.

24. The multi-layered structure of claim 1 wherein said microporous layer has a thickness between 50 μm and 150 μm.

25. The multi-layered structure of claim 24 wherein said electrospun nanofiber layer has a thickness between 10 μm and 200 μm.

26. The multi-layered structure of claim 24 wherein said backing layer has a thickness between 50 μm and 100 μm.

27. The multi-layered structure of claim 1 wherein said electrospun nanofiber layer is electrospun from a liquid polymer.

28. The multi-layered structure of claim 27 wherein said liquid polymer further comprises Polyvinylidene fluoride.

29. The multi-layered structure of claim 1 wherein said backing layer comprises melt blown fiber.

30. The multi-layered structure of claim 29 wherein said melt blown fiber comprises Polyethylene terephthalate.

31. The multi-layered structure of claim 29 wherein said melt blown fiber comprises Polyethylene.

32. The multi-layered structure of claim 29 wherein said melt blown fiber comprises Polytetrafluoroethylene.

33. The multi-layered structure of claim 1 wherein said microporous layer further comprises polydimethylsiloxane (PDMS).

34. The multi-layered structure of claim 33 wherein said microporous layer comprises a PDMS concentration between 0 wt % and 6 wt %.

35. The multi-layered structure of claim 33 wherein said microporous layer comprises a PDMS concentration of 6 wt %.

36. The multi-layered structure of claim 35 wherein said multi-layered structure is able to withstand a LEP of at least 730 kilopascals.

* * * * *